United States Patent
Lee

(10) Patent No.: US 9,722,481 B2
(45) Date of Patent: Aug. 1, 2017

(54) VOICE COIL MOTOR

(71) Applicant: LG INNOTEK CO., LTD., Seoul (KR)

(72) Inventor: Sanghee Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/214,018

(22) Filed: Jul. 19, 2016

(65) Prior Publication Data

US 2016/0329802 A1 Nov. 10, 2016

Related U.S. Application Data

(63) Continuation of application No. 14/026,835, filed on Sep. 13, 2013, now Pat. No. 9,431,885, which is a
(Continued)

(30) Foreign Application Priority Data

Jul. 19, 2010 (KR) .................. 10-2010-0069652

(51) Int. Cl.
| H02K 41/035 | (2006.01) |
| H02K 33/04 | (2006.01) |
| G03B 3/10 | (2006.01) |

(52) U.S. Cl.
CPC ........... *H02K 41/0356* (2013.01); *G03B 3/10* (2013.01); *H02K 33/04* (2013.01)

(58) Field of Classification Search
CPC ........ H02K 41/03; H02K 33/18; G02B 7/102; G02B 7/08
(Continued)

(56) References Cited

U.S. PATENT DOCUMENTS

| 7,400,463 B1 | 7/2008 | Wu |
| 7,486,882 B2 | 2/2009 | Okita et al. |
| (Continued) | | |

FOREIGN PATENT DOCUMENTS

| CN | 1952719 A | 4/2007 |
| CN | 101068091 A | 11/2007 |
| (Continued) | | |

OTHER PUBLICATIONS

Office Action dated Dec. 18, 2014 in Chinese Application No. 201110201818.6.
(Continued)

*Primary Examiner* — Hanh Nguyen
*Assistant Examiner* — Leda Pham
(74) *Attorney, Agent, or Firm* — Saliwanchik, Lloyd & Eisenschenk

(57) ABSTRACT

Disclosed is a voice coil motor, the motor including a mover having a bobbin equipped with a lens and a coil block secured to an outer circumference of the bobbin; a stator having a magnet that is disposed in such a way as to face the coil block; elastic members coupled to a lower end of the bobbin and connected to both ends of the coil block; a base supporting the elastic members and the stator; and a cover can covering the mover, the stator and the base, with an opening being formed in the cover can to expose the lens therethrough, wherein each of the elastic members includes a terminal portion that extends between the cover can and a side surface of the base, the terminal portion including a short-circuit prevention portion so as to inhibit a short-circuit between the terminal portion and the cover can.

21 Claims, 9 Drawing Sheets

Related U.S. Application Data continuation of application No. 13/184,866, filed on Jul. 18, 2011, now Pat. No. 8,558,419.

(58) Field of Classification Search
USPC .................................................... 310/12.16
IPC ........................................... H02K 41/03,33/18
See application file for complete search history.

(56) References Cited

U.S. PATENT DOCUMENTS

| | | | | |
|---|---|---|---|---|
| 7,715,131 | B2* | 5/2010 | Chou | G02B 7/102 |
| | | | | 359/819 |
| 7,824,115 | B2* | 11/2010 | Shih | G02B 7/08 |
| | | | | 396/133 |
| 7,936,523 | B2* | 5/2011 | Higuchi | G02B 7/08 |
| | | | | 359/814 |
| 8,068,295 | B2* | 11/2011 | Park | G02B 7/08 |
| | | | | 359/819 |
| 8,247,931 | B2 | 8/2012 | Liao | |
| 8,283,814 | B2 | 10/2012 | Liao | |
| 8,295,695 | B2 | 10/2012 | Yoshida et al. | |
| 2006/0181748 | A1 | 8/2006 | Makii et al. | |
| 2007/0086770 | A1 | 4/2007 | Okita et al. | |
| 2008/0117536 | A1 | 5/2008 | Higuchi | |
| 2008/0212959 | A1 | 9/2008 | Shin et al. | |
| 2010/0061000 | A1 | 3/2010 | Higuchi | |
| 2010/0270870 | A1 | 10/2010 | Liao | |

FOREIGN PATENT DOCUMENTS

| | | |
|---|---|---|
| CN | 101178470 A | 5/2008 |
| CN | 101546949 A | 9/2009 |
| JP | 2006081387 A | 3/2006 |
| KR | 20070042080 A | 4/2007 |
| KR | 20070111171 A | 11/2007 |

OTHER PUBLICATIONS

Office Action dated Jan. 14, 2013 in U.S. Appl. No. 13/184,866.
Office Action dated Sep. 5, 2014 in U.S. Appl. No. 14/026,835.
Office Action dated Apr. 24, 2015 in U.S. Appl. No. 14/026,835.
Office Action dated Dec. 7, 2016 in Chinese Application No. 10521508120.
Office Action dated Aug. 10, 2016 in Korean Application No. 1020100069652.

* cited by examiner

VOICE COIL MOTOR

CROSS-REFERENCE TO RELATED APPLICATION

This application is a continuation of U.S. application Ser. No. 14/026,835, filed Sep. 13, 2013; which is a continuation of U.S. application Ser. No. 13/184,866, filed Jul. 18, 2011, now U.S. Pat. No. 8,558,419, issued Oct. 15, 2013; which claims the benefit under 35 U.S.C. §119 of Korean Patent Application No. 10-2010-0069652, filed Jul. 19, 2010, which are hereby incorporated by reference in their entirety.

BACKGROUND OF THE INVENTION

Field of the Invention

The present invention relates to a voice coil motor.

Description of the Related Art

Recently, a variety of optical devices, such as a mobile phone equipped with a micro digital camera, have been developed.

As for the micro digital camera applied to the conventional mobile phone, it is impossible to adjust an interval between a lens used to concentrate external light and an image sensor used to convert the external light into an image. However, recently, the interval between the image sensor and the lens can be adjusted by a lens driving device such as a voice coil motor, so that the mobile phone can obtain a more improved image.

A conventional voice coil motor includes a mover, a stator, an elastic member, and a cover can. The mover includes a coil block that produces a magnetic field to drive a lens up and down. The stator faces the mover, and produces a magnetic field to drive the mover. The elastic member elastically supports the mover that moves up and down. The cover can covers the mover, the stator and the elastic member.

Meanwhile, in order to produce the magnetic field from the coil block, the coil block is electrically connected to the elastic member, and the elastic member is electrically connected to an external circuit board.

In recent years, in order to block harmful electromagnetic waves produced from the voice coil motor, the cover can covers surfaces of the voice coil motor other than a bottom surface thereof. Such a construction causes a portion of the elastic member for connecting the elastic member to the external circuit board and the cover can to be short-circuited, so that the malfunction of the voice coil motor frequently occurs.

BRIEF SUMMARY

Accordingly, the present invention provides a voice coil motor, which is intended to inhibit a cover can for blocking harmful electromagnetic waves and a portion of an elastic member supplying power to a coil block from being electrically short-circuited, thus inhibiting the malfunction of the voice coil motor.

In one general aspect of the present invention, there is provided a voice coil motor, the motor comprising: a mover including a bobbin equipped with a lens and a coil block secured to an outer circumference of the bobbin; a stator including a magnet that is disposed in such a way as to face the coil block; elastic members coupled to a lower end of the bobbin and connected to both ends of the coil block; a base supporting the elastic members and the stator; and a cover can covering the mover, the stator and the base, with an opening being formed in the cover can to expose the lens therethrough, wherein each of the elastic members comprises a terminal portion that extends between the cover can and a side surface of the base, the terminal portion including a short-circuit prevention portion so as to inhibit a short-circuit between the terminal portion and the cover can.

DETAILED DESCRIPTION

Figure 1:
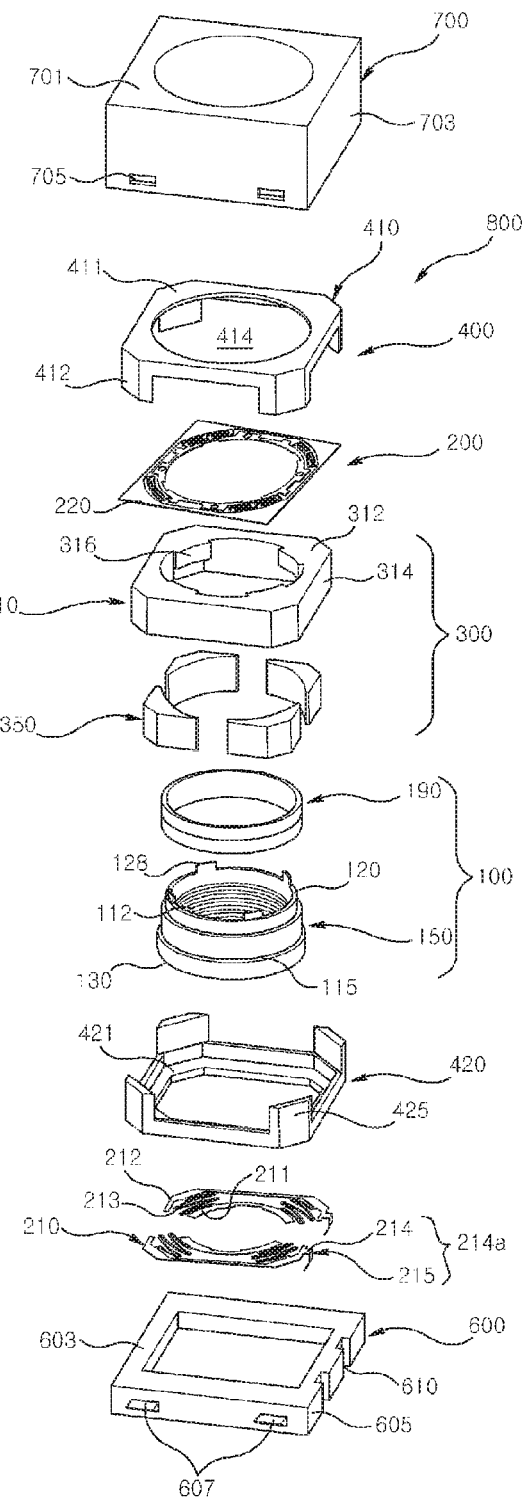
FIG. 1 is an exploded perspective view showing a voice coil motor in accordance with an exemplary embodiment of the present invention.

Hereinafter, exemplary embodiments of the present invention will be described in detail with reference to the accompanying drawings. For clarity and convenience of description, the size or shape of components shown in the drawings may not be illustrated to scale. Further, terminologies defined in consideration of the construction and effect of the present invention may be changed according to a user or operator intention or the custom. These terminologies should be interpreted as having meanings and concepts in keeping with the technical spirit of the present invention based on the overall detailed description.

Figure 2:
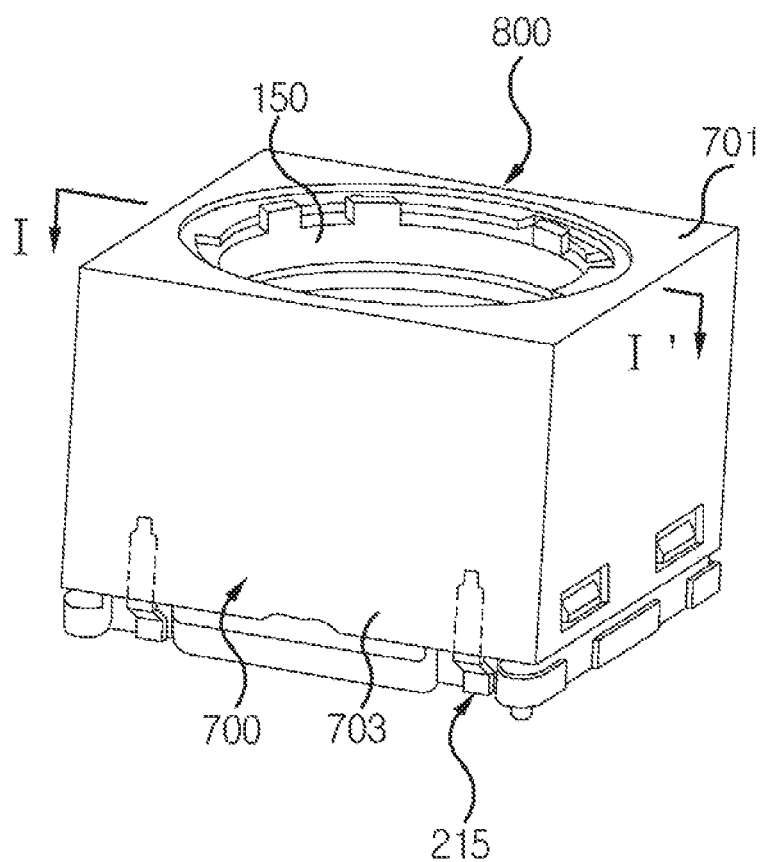
FIG. 2 is a perspective view showing an external appearance of the voice coil motor of FIG. 1.
Figure 3:
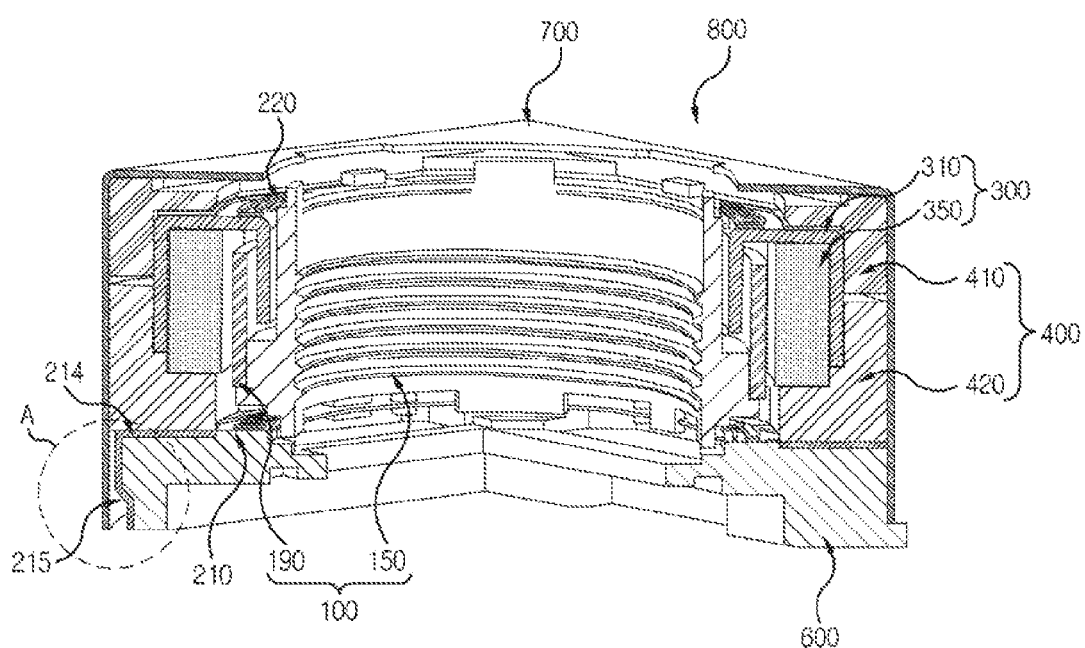
FIG. 3 is a sectional view taken along line I-I' of FIG. 2.
Figure 4:
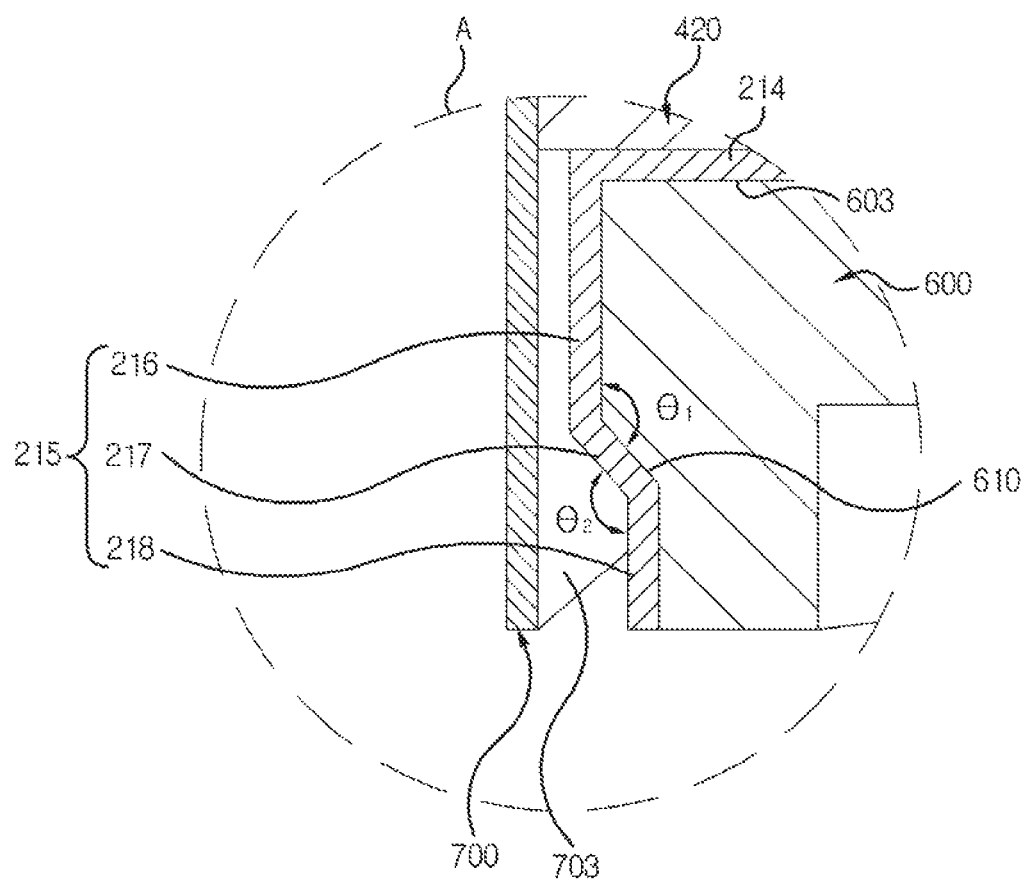
FIG. 4 is an enlarged view showing portion 'A' of FIG. 3.

FIG. 1 is an exploded perspective view showing a voice coil motor in accordance with an exemplary embodiment of the present invention. FIG. 2 is a perspective view showing an external appearance of the voice coil motor of FIG. 1. FIG. 3 is a sectional view taken along line I-I' of FIG. 2. FIG. 4 is an enlarged view showing portion 'A' of FIG. 3.

Referring to FIGS. 1 to 4, a voice coil motor 800 includes a mover 100, an elastic member 200, a stator 300, a casing 400, a base 600 and a cover can 700.

The mover 100 includes a bobbin 150 and a coil block 190.

The bobbin 150 is formed, for example, to have the shape of a cylinder that has a hole for receiving a lens therein. The cylindrical bobbin 150 includes an upper surface 120 and a lower surface 130 that is opposite to the upper surface 120.

An internal threaded portion 112 is formed on an inner circumference of the bobbin 150 to receive the lens, and a lens holding member (not shown) is fastened to the internal threaded portion 112. The lens is coupled to the lens holding member. Unlike this construction, the lens may be directly fastened to the internal threaded portion 112 of the bobbin 150.

A step 115 is provided on a lower portion of an outer circumference of the bobbin 150 to support the coil block 190 that will be described below in detail.

Projection-shaped bosses are provided on the lower surface 130 of the bobbin 150, so that first elastic members 210 of the elastic member 200, which will be described below in detail, are coupled to the bobbin 150 using the bosses.

The coil block 190 of the mover 100 is placed on the step 115 which is formed on the bobbin 150. The coil block 190 is formed, for example, by winding a coil into a cylindrical shape.

The coil block 190 is directly wound around the outer circumference of the bobbin 150. Alternatively, after the coil is wound in a cylindrical shape, this may be attached to the outer circumference of the bobbin 150 by an adhesive or the like.

The elastic member 200 includes the first elastic members 210 and a second elastic member 220. In the embodiment of the present invention, the first and second elastic members 210 and 220 may comprise plate springs.

The first elastic members 210 are coupled to the lower surface 130 of the bobbin 150. For example, the first elastic members 210 may comprise two elastic members. The first elastic members 210 are coupled, respectively, to the bosses of the lower surface 130 of the bobbin 150.

Each of the two first elastic members 210 includes an inner portion 211, an outer portion 212 and a coupling portion 213.

The inner portion 211 is coupled to the corresponding boss that is provided on the lower surface 130 of the bobbin 150, the outer portion 212 is secured between the base 600 that will be described below in detail and a lower casing 420 of the casing 400, and the coupling portion 213 couples the inner portion 211 with the outer portion 212.

The second elastic member 220 is coupled to the upper surface 120 of the bobbin 150.

The stator 300 includes a yoke 310 and magnets 350.

The yoke 310 includes a top plate 312, side plates 314 and a yoke portion 316.

When viewed on a plane, the top plate 312 of the yoke 310 may be formed to have the shape of a rectangular plate, with a circular opening being formed in a central portion of the top plate 312 to expose an upper end of the bobbin 150.

The side plates 314 extend from four edges of the top plate 312 in such a way as to be parallel to the outer circumference of the bobbin 150. The side plates 314 are formed integrally with the four edges of the top plate 312.

The yoke portion 316 protrudes from an inner surface of the top plate 312, which is defined by the circular opening of the top plate 312, toward the lower end of the bobbin 150. The yoke portion 316 is located at a position in such a way as to be inserted into a space defined between the bobbin 150 and the coil block 190.

The magnets 350 are disposed in space defined by the top plate 312 and the side plates 314 of the yoke 310. The respective magnets 350 are placed in such a way as to face the coil block 190.

Force generated by interaction between a magnetic field produced from the magnets 350 and a magnetic field produced from the coil block 190 may move the bobbin 150 up. The bobbin 150 is elastically supported by the first and second elastic members 210 and 220. Here, by precisely adjusting current applied to the coil block 190, a moving distance of the bobbin 150 can be precisely adjusted.

The casing 400 includes an upper casing (or upper spacer) 410 and a lower casing (or lower spacer) 420.

The upper casing 410 includes a top plate 411 and coupling pillars 412. The upper casing 410 is placed on an upper portion of the yoke 310, and the second elastic member 220 of the elastic member 200 is interposed between the upper casing 410 and the yoke 310.

When viewed on a plane, the top plate 411 of the upper casing 410 may be formed to have the shape of a rectangular plate. An opening 414 is formed in a central portion of the top plate 411 of the upper casing 410 to expose the bobbin 150 through the opening 414.

The coupling pillars 412 of the upper casing 410 protrude from four corners of the top plate 411 in such a way as to be parallel to the bobbin 150. The coupling pillars 412 are coupled to the lower casing 420 that will be described below in detail.

The lower casing 420 includes pillars 425 that are coupled, respectively, with the coupling pillars 412 of the upper casing 410.

The base 600 functions to support the first elastic member 210 of the elastic member 200 that elastically supports the stator 300 and the mover 100. Further, an IR filter and/or an image sensor unit (not shown) may be mounted on the base 600.

The base 600 may be shaped, for example, like a plate of a rectangular parallelepiped, and an opening 601 is formed in a central portion of the base 600 in such a way as to correspond to the lens mounted to the bobbin 150.

The base 600 shaped like the rectangular parallelepiped plate includes an upper surface 603 and side surfaces 605 connected to the upper surface 603. Among the side surfaces 605 of the base 600, facing side surfaces have hooks 607.

Further, one pair of receiving recesses 610 is formed concavely in a side surface 605 of the base 600 on which no hook 607 is formed. Each receiving recess 610 is formed at a position corresponding to a short-circuit prevention portion that is provided on each first elastic member 210 of the elastic member 200, which will be described later.

In an embodiment of the present invention, each receiving recess 610 may be formed in the side surface 605 of the base 600 such that a depth of the recess 610 is gradually increased or variable in a direction from the upper surface of the base 600 to a lower surface that is opposite to the upper surface. Unlike this, the receiving recess 610 may be formed such that its depth is constant. A short-circuit prevention portion 215 that will be described below in detail is in close contact with a bottom surface formed by the receiving recess 610.

Meanwhile, a ground terminal may be provided on the upper surface 603 of the base 600 to ground the cover can 700 that will be described below in detail.

The cover can 700 is shaped like a hexahedral box that is open at a lower surface, and an opening is formed in a top plate 701 of the cover can 700 to expose the lens mounted to the bobbin 150 through the opening.

Side plates 703 are formed integrally on edges of the top plate 701 of the cover can 700, and hook insertion holes 705 are formed in the side plates 703 in such a way as to correspond to the hooks 607 of the base 600, so that the hooks 607 are inserted into the hook insertion holes 705.

For example, the cover can 700 converts harmful electromagnetic waves produced from an inside of the voice coil motor 800 into heat or current, thus inhibiting the harmful electromagnetic waves from being emitted to the outside of the voice coil motor 800. To this end, the cover can 700 is manufactured, for example, using a metal plate that is suitable for blocking electromagnetic waves.

Referring to FIGS. 3 and 4, the first elastic members 210 of the elastic member 200 are disposed on the base 600, and a terminal portion 214a is provided on the outer portion 212 of each first elastic member 210.

The terminal portion 214a includes a connection portion 214 and the short-circuit prevention portion 215. The connection portion 214 and the short-circuit prevention portion 215 of the terminal portion 214a provided on the first elastic member 210 apply a driving signal from an external board to the coil block 190 provided on the outer circumference of the bobbin 150. In an embodiment of the present invention, the short-circuit prevention portion 215 may protrude downwards from the base 600.

The connection portion 214 extends from an edge of the outer portion 212. The connection portion 214 is interposed between the upper surface 603 of the base 600 and the lower casing 420.

The short-circuit prevention portion 215 may include a first short-circuit prevention portion 216, a second short-circuit prevention portion 217, and a third short-circuit prevention portion 218.

The first short-circuit prevention portion 216 extends from the connection portion 214. The first short-circuit prevention portion 216 extends between the receiving recess 610 formed in the side surface of the base 600 and an inner surface of the side plate 703 of the cover can 700. The first short-circuit prevention portion 216 is formed, for example, to be perpendicular to the connection portion 214.

The second short-circuit prevention portion 217 extends from the first short-circuit prevention portion 216. The second short-circuit prevention portion 217 is bent from the first short-circuit prevention portion 216, and forms an obtuse angle θ1 with the first short-circuit prevention portion 216.

The third short-circuit prevention portion 218 extends from the second short-circuit prevention portion 217, and is bent from the second short-circuit prevention portion 217 in such a way as to be parallel to the side plate 703 of the cover can 700. Thus, the second short-circuit prevention portion 217 and the third short-circuit prevention portion 218 form an obtuse angle θ2 therebetween.

In an embodiment of the present invention, the receiving recess 610 formed in the base 600 to receive the short-circuit prevention portion 215 has shape corresponding to that of the first to third short-circuit prevention portions 216, 217 and 218. Thus, the first to third short-circuit prevention portions 216, 217 and 218 come into close contact with the bottom surface defined by the receiving recess 610 formed in the side surface 605 of the base 600.

Further, an adhesive may be interposed between the bottom surface defined by the receiving recess 610 and the first to third short-circuit prevention portions 216, 217 and 218 so as to inhibit the first to third short-circuit prevention portions 216, 217, and 218 from making contact with the cover can 700.

According to an embodiment of the present invention, the receiving recess 610 is formed in the base 600, and at least a portion of the short-circuit prevention portion 215 extending from each first elastic member 210 placed on the base 600 is inclined from the inner surface of the side plate 703 of the cover can 700, thus inhibiting the cover can 700 and the first elastic member 210 from being electrically short-circuited.

Figure 5:
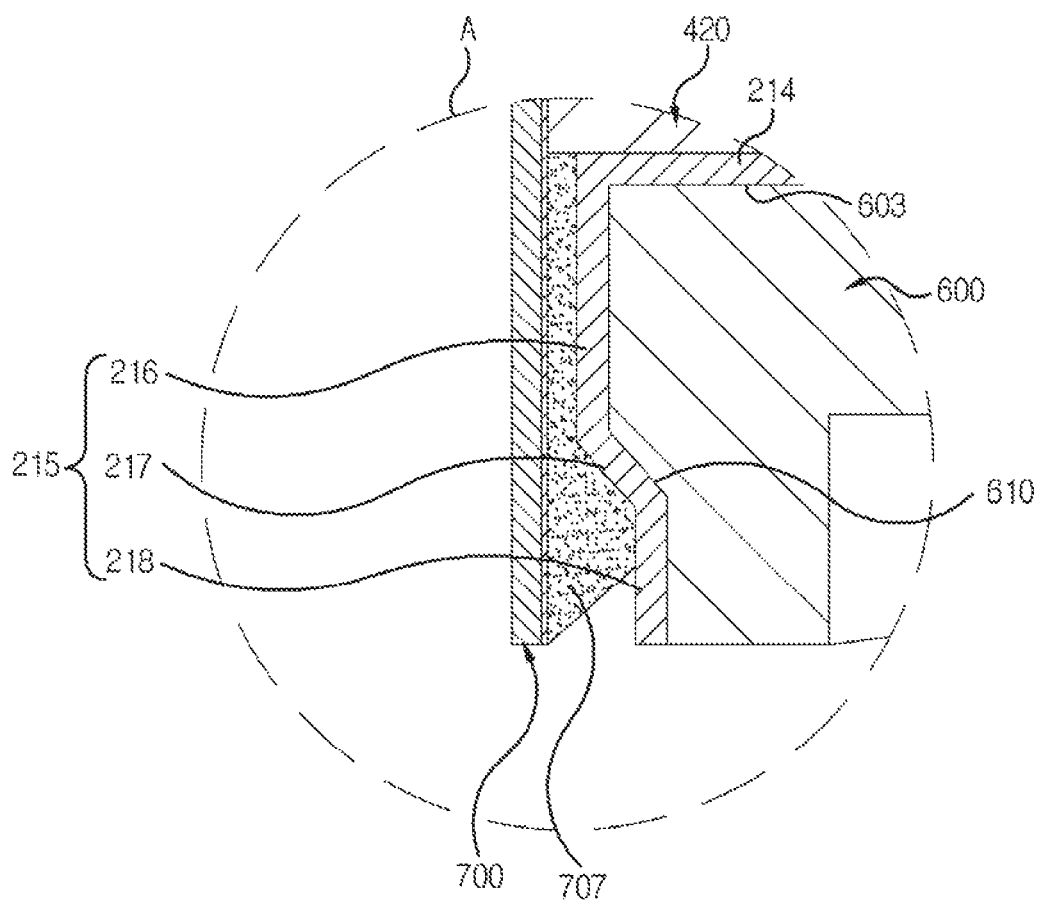
FIG. 5 is a sectional perspective view showing a short-circuit prevention portion of a voice coil motor in accordance with another exemplary embodiment of the present invention.

FIG. 5 is a sectional perspective view showing a short-circuit prevention portion of a voice coil motor in accordance with another exemplary embodiment of the present invention. The general construction of the voice coil motor shown in FIG. 5 remains the same as the voice coil motor shown in and described with reference to FIGS. 1 to 4, except form an insulation member. Therefore, the duplicated description of the same construction will be omitted, and the same component will carry the same reference numeral.

Referring to FIG. 5, even though the receiving recess 610 is formed in the base 600 and the short-circuit prevention portion 215 electrically connected to the first elastic member 210 is provided in the receiving recess 610, if external strong shock or vibration is applied to the voice coil motor, the short-circuit prevention portion 215 moves slightly, so that the inner surface of the side plate 703 of the cover can 700 and the short-circuit prevention portion 215 may come into contact with each other and thereby may be short-circuited. In an embodiment of the present invention, an insulation layer 707 may be coated on the inner surface of the side plate 703 facing the short-circuit prevention portion 215 so as to inhibit the side plate 703 of the cover can 700 and the short-circuit prevention portion 215 from being short-circuited.

In an embodiment of the present invention, the insulation layer 707 may be formed throughout the overall area of the inner surface of the side plate 703 of the cover can 700 or formed locally on the inner surface of the side plate 703 corresponding to the short-circuit prevention portion 215.

Figure 6:
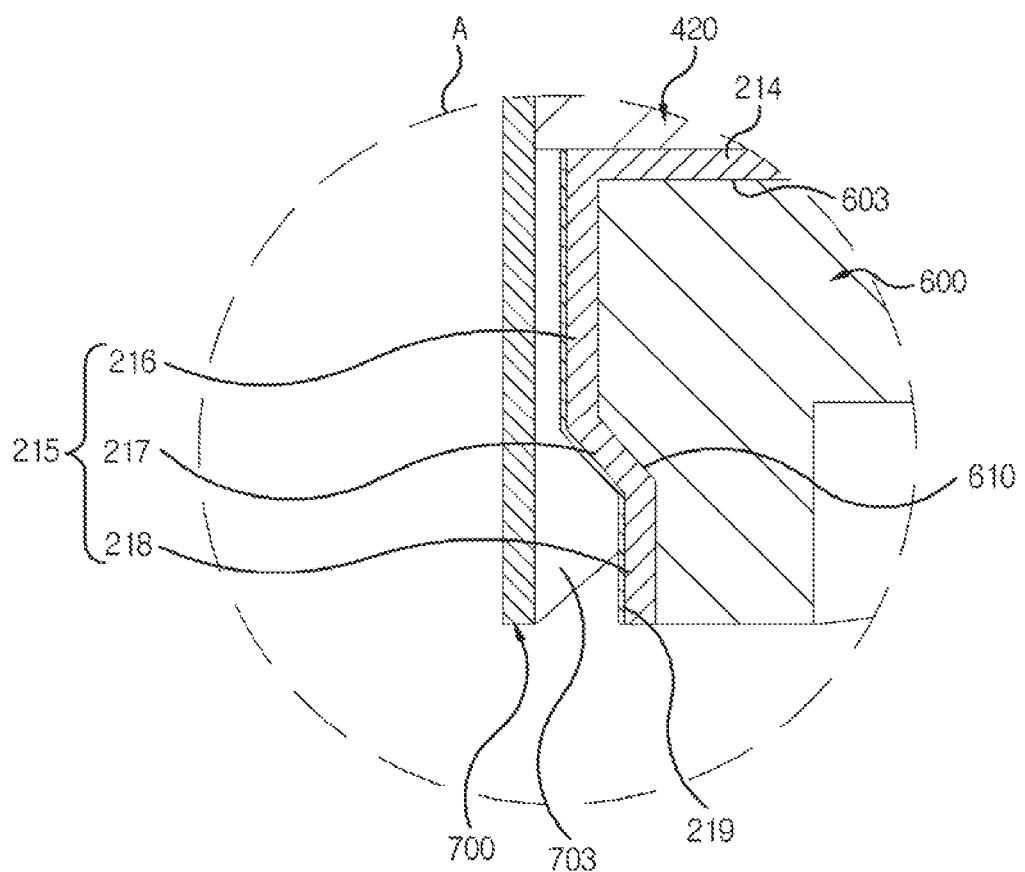
FIG. 6 is a sectional perspective view showing a short-circuit prevention portion of a voice coil motor in accordance with a further exemplary embodiment of the present invention.

FIG. 6 is a sectional perspective view showing a short-circuit prevention portion of a voice coil motor in accordance with a further exemplary embodiment of the present invention. The general construction of the voice coil motor shown in FIG. 6 remains the same as the voice coil motor shown in and described with reference to FIGS. 1 to 4, except form an insulation member. Therefore, the duplicated description of the same construction will be omitted, and the same component will carry the same reference numeral.

Referring to FIG. 6, even though the receiving recess 610 is formed in the base 600 and the short-circuit prevention portion 215 electrically connected to the first elastic member 210 is provided in the receiving recess 610, if external strong shock or vibration is applied to the voice coil motor, the short-circuit prevention portion 215 moves slightly, so that the inner surface of the side plate 703 of the cover can 700 and the short-circuit prevention portion 215 may come into contact with each other and thereby may be short-circuited. In an embodiment of the present invention, an insulation layer 707 may be coated on a surface of the short-circuit prevention portion 215 facing the inner surface of the side plate 703 so as to inhibit the side plate 703 of the cover can 700 and the short-circuit prevention portion 215 from being short-circuited.

The insulation layer 219 may be formed throughout the overall area of the surface of the short-circuit prevention portion 215.

According to the embodiment of the present invention, the insulation layer is formed on either of the inner surface of the cover can 700 or the short-circuit prevention portion 215. However, without being limited to the embodiment, a first insulation member may be provided on the short-circuit prevention portion 215 facing the cover can 700, and a second insulation member may be provided on the inner surface of the cover can 700 facing the short-circuit prevention portion 215.

Figure 7:
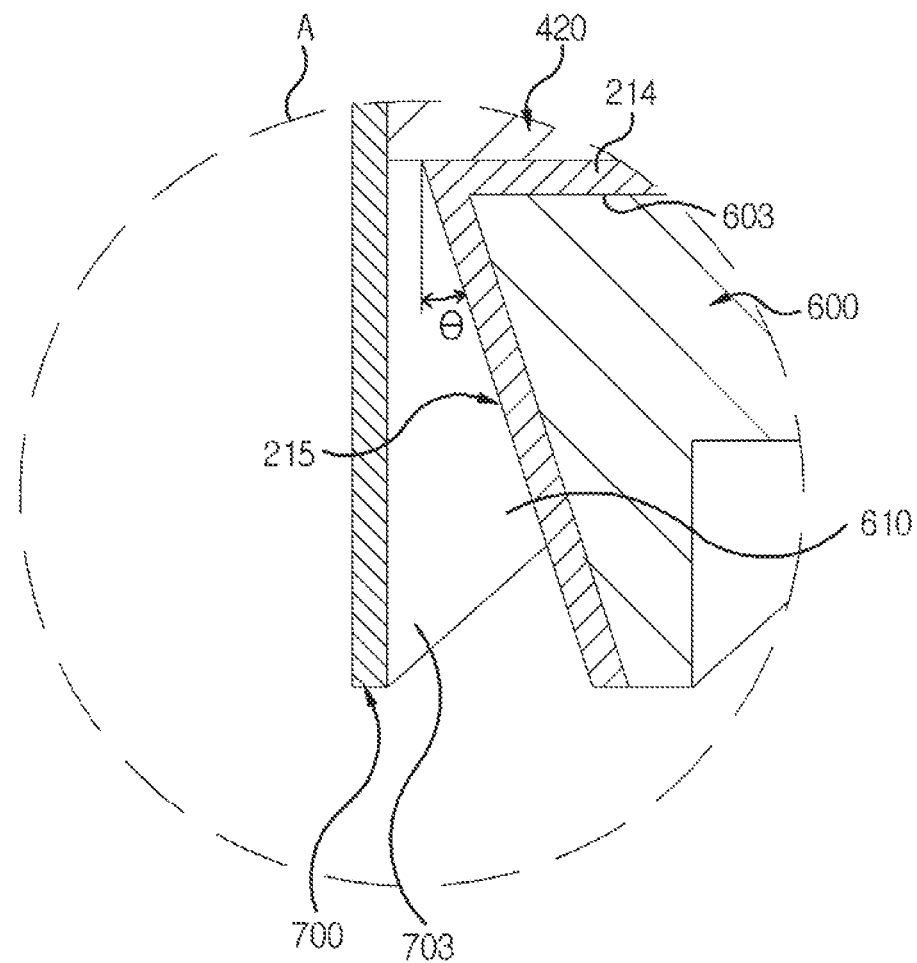
FIG. 7 is a sectional perspective view showing a short-circuit prevention portion of a voice coil motor in accordance with another exemplary embodiment of the present invention.

FIG. 7 is a sectional perspective view showing a short-circuit prevention portion of a voice coil motor in accordance with another exemplary embodiment of the present invention. The general construction of the voice coil motor shown in FIG. 7 remains the same as the voice coil motor shown in and described with reference to FIGS. 1 to 4, except form a short-circuit prevention portion. Therefore, the duplicated description of the same construction will be omitted, and the same component will carry the same reference numeral.

Referring to FIGS. 1 to 7, the short-circuit prevention portion 215, connected to the connection portion 214 extending from the outer portion 212 of the first elastic member 210, is shaped like a linear plate. The short-circuit prevention portion 215 shaped like the linear plate forms an acute angle θ with the inner surface of the side plate 703 of the cover can 700.

Further, among surfaces formed by the receiving recess 610 of the base 600 corresponding to the short-circuit prevention portion 215 which is not bent, the surface corresponding to the short-circuit prevention portion 215 is formed as a reverse inclined surface in such a way as to be in close contact with the short-circuit prevention portion 215.

Figure 8:
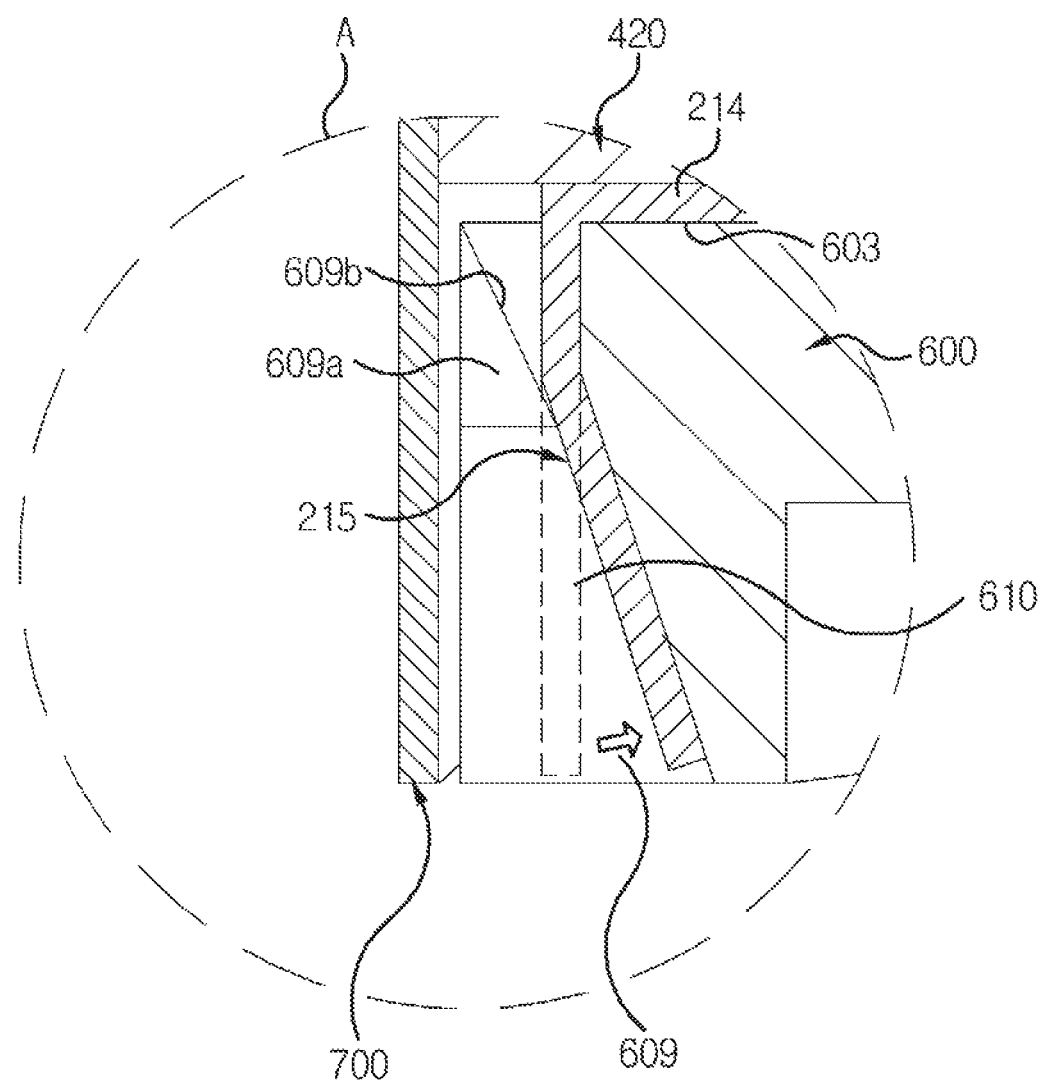
FIG. 8 is a sectional perspective view showing a short-circuit prevention portion and a guide portion of a voice coil motor in accordance with another exemplary embodiment of the present invention.
Figure 9:
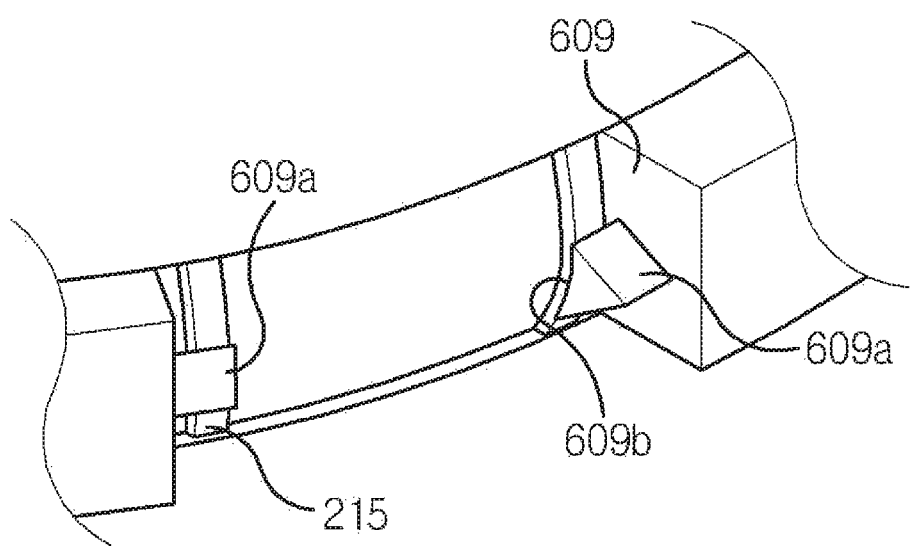
FIG. 9 is a perspective view showing the guide portion and the short-circuit prevention portion of FIG. 8.

FIG. 8 is a sectional perspective view showing a short-circuit prevention portion and a guide portion of a voice coil motor in accordance with another exemplary embodiment of the present invention. FIG. 9 is a perspective view showing the guide portion and the short-circuit prevention portion of FIG. 8. The general construction of the voice coil motor shown in FIGS. 8 and 9 remains the same as the voice coil motor shown in and described with reference to FIGS. 1 to 4, except form the guide portion. Therefore, the duplicated description of the same construction will be omitted, and the same component will carry the same reference numeral.

Referring to FIGS. 8 and 9, the short-circuit prevention portion 215 is bent from the connection portion 214 electrically connected to the first elastic member 210. For example, the short-circuit prevention portion 215 is formed to be perpendicular to the connection portion 214.

Meanwhile, guide ribs 609a are provided, respectively, on opposite side walls 609 that are defined by the receiving recess 610 formed in the side surface 605 of the base 600. Each guide rib 609a guides the short-circuit prevention portion 215, which is disposed to be perpendicular to the connection portion 214, to allow the short-circuit prevention portion 215 to be inclined relative to the inner surface of the side plate 703 of the cover can 700 without an additional bending process.

To this end, each guide rib 609a includes an inclined surface 609b, and the inclined surface 609a is formed as a reverse inclined surface relative to the side surface 605 of the base 600, and the side surface 605 of the base 600 and the inclined surface 609b are, for example, formed at an acute angle.

In an embodiment of the present invention, the short-circuit prevention portion 215 is bent to be spaced apart from the side plate 703 of the cover can 700 using the guide rib 609a during assembly, thus preventing the first elastic member 210 and the cover can 700 from being electrically short-circuited.

Meanwhile, unlike the above-mentioned embodiment of the present invention, in order to inhibit the short-circuit prevention portion 215 and the cover can 700 from being short-circuited, a portion of the cover can 700 corresponding to the short-circuit prevention portion 215 may be cut and then an insulation plate may be provided in the cut portion of the cover can 700.

Further, unlike the above-mentioned embodiment of the present invention, in order to inhibit the short-circuit prevention portion 215 and the cover can 700 from being short-circuited, the inner surface of the cover can 700 corresponding to the short-circuit prevention portion 215 may protrude outwards. Such a construction can also inhibit the cover can 700 and the short-circuit prevention portion 215 from being short-circuited.

As described above, the present invention provides a voice coil motor, in which a cover can cover surfaces of the voice coil motor other than a bottom surface thereof so as to block harmful electromagnetic waves, and an elastic member is provided with a short-circuit prevention portion so as to inhibit the cover can and the elastic member placed on a base from being in electric contact with each other, so that operation characteristics of the voice coil motor can be more improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A voice coil motor (VCM), comprising:
   a base comprising a step part outwardly protruding from at least a portion of an outer lateral surface of the base;
   a cover can of metal material, the cover can comprising an upper plate formed with an opening and a lateral plate downwardly extended from the upper plate, wherein a lower end of the lateral plate of the cover can is disposed on the step part;
   a bobbin disposed within the cover can and over the base;
   a coil disposed on the bobbin;
   a magnet disposed within the cover can and facing the coil;
   a lower elastic member coupled to a lower portion of the bobbin, disposed on an upper surface of the base and configured to movably support the bobbin along an optical axis, wherein the lower elastic member comprises two lower elastic units spaced apart from each other, and wherein each of the two lower elastic units is electrically connected to the coil; and
   two terminal parts coupled to the two lower elastic units;
   wherein the base comprises two grooves inwardly recessed from the step part, and spaced apart from each other;
   wherein the two terminal parts are disposed on the two grooves, respectively;
   wherein at least a portion of the lower end of the lateral plate of the cover can is disposed lower than the lower elastic member,
   wherein the lower elastic member is spaced apart from the lateral plate of the cover can, and
   wherein an insulation member is disposed between the lateral plate of the cover can and the two terminal parts.

2. The VCM of claim 1, wherein two grooves comprise a first groove and a second groove spaced apart from the first groove,
   wherein the two terminal parts comprise a first terminal part disposed on the first groove and a second terminal part disposed on the second groove, and
   wherein the two lower elastic units comprise a first lower elastic unit coupled with the first terminal part and a second lower elastic unit coupled with the second part.

3. The VCM of claim 2, wherein the first terminal part is integrally formed with the first lower elastic unit, and the second terminal part is integrally formed with the second lower elastic unit.

4. The VCM of claim 1, wherein the two terminal parts are spaced apart from the lateral plate of the cover can in a direction perpendicular to the optical axis.

5. The VCM of claim 1, wherein the lower elastic member is overlapped with the lateral plate of the cover can in a direction perpendicular to the optical axis.

6. The VCM of claim 1, wherein an angle formed between each terminal part and the lateral plate of the cover can is an acute angle.

7. The VCM of claim 1, wherein a depth of the two grooves grows deeper from the upper surface of the base to a lower surface of the base.

8. The VCM of claim 1, further comprising:
an upper elastic member coupled to an upper portion of the bobbin; and
a case inside the cover can,
wherein the upper elastic member is coupled to the case.

9. The VCM of claim 1, wherein the magnet is arranged at a corner of the cover can.

10. The VCM of claim 1, wherein the cover can is configured to be electrically connected to a ground portion.

11. The VCM of claim 2, wherein the first and second terminal parts are fixed to the first and second grooves, respectively, by an adhesive.

12. The VCM of claim 2, wherein the first lower elastic unit comprises a first inner elastic unit coupled to the lower portion of the bobbin, a first outer elastic unit fixed to the base, and a first connection elastic unit electrically connecting the first inner elastic unit and the first outer elastic unit, and
wherein the second lower elastic unit comprises a second inner elastic unit coupled to the lower portion of the bobbin, a second outer elastic unit fixed to the base, and a second connection elastic unit electrically connecting the second inner elastic unit and the second outer elastic unit.

13. The VCM of claim 2, wherein the insulation member is overlapped with the cover can and the first terminal part in a direction perpendicular to the optical axis, and wherein the insulation member is overlapped with the cover can and the second terminal part in a direction perpendicular to the optical axis.

14. The VCM of claim 2, wherein a depth of the two grooves is the same from an upper surface of the base to a lower surface of the base.

15. The VCM of claim 2, wherein the first and second terminal parts are not protruded beyond the step part of the base.

16. The VCM of claim 2, wherein a depth of the first groove at an upper surface of the base is different from that at a lower surface of the base, and wherein a depth of the second groove at the upper surface of the base is different from that at the lower surface of the base.

17. The VCM of claim 2, wherein the first and second terminal parts are arranged within a boundary of the cover can when viewed from the top.

18. The VCM of claim 2, wherein a distal end of each of the first and second terminal parts are not protruded beyond a bottom surface of the base.

19. The VCM of claim 2, wherein a part of the cover can opposite to the first and second terminal parts has a cut portion, and the insulation member is disposed in the cut portion of the cover can.

20. A camera, comprising:
a printed circuit board;
an image sensor coupled with the printed circuit board;
a base comprising a step part outwardly protruding from at least a portion of an outer lateral surface of the base;
a cover can of metal material, the cover can comprising an upper plate formed with an opening and a lateral plate downwardly extended from the upper plate, wherein a lower end of the lateral plate of the cover can is disposed on the step part;
a bobbin disposed within the cover can and over the base;
a lens coupled to the bobbin;
a coil disposed on the bobbin;
a magnet disposed within the cover can and facing the coil;
a lower elastic member coupled to a lower portion of the bobbin, disposed on an upper surface of the base and configured to movably support the bobbin along an optical axis, wherein the lower elastic member comprises two lower elastic units spaced apart from each other, and wherein each of the two lower elastic units is electrically connected to the coil; and
two terminal parts coupled to the two lower elastic units;
wherein the base comprises two grooves inwardly recessed from the step part and spaced apart from each other,
wherein the two terminal parts are disposed on the two grooves, respectively,
wherein at least a portion of the lower end of the lateral plate of the cover can is disposed lower than the lower elastic member,
wherein the lower elastic member is spaced apart from the lateral plate of the cover can, and
wherein an insulation member is disposed between the lateral plate of the cover can and the two terminal parts.

21. An optical apparatus, comprising:
a printed circuit board;
an image sensor coupled with the printed circuit board;
a base disposed over the printed circuit board and comprising a step part outwardly protruding from at least a portion of an outer lateral surface of the base;
a cover can of metal material, the cover can comprising an upper plate formed with an opening and a lateral plate downwardly extended from the upper plate, wherein a lower end of the lateral plate of the cover can is disposed on the step part;
a bobbin disposed within the cover can and over the base;
a lens coupled to the bobbin;
a coil disposed on the bobbin;
a magnet disposed within the cover can and facing the coil;
a lower elastic member coupled to a lower portion of the bobbin, disposed on an upper surface of the base and configured to movably support the bobbin along an optical axis, wherein the lower elastic member comprises two lower elastic units spaced apart from each other, and wherein each of the two lower elastic units is electrically connected to the coil; and
two terminal parts coupled to the two lower elastic units;
wherein the base comprises two grooves inwardly recessed from the step part and spaced apart from each other,
wherein the two terminal parts are disposed on the two grooves, respectively,
wherein at least a portion of the lower end of the lateral plate of the cover can is disposed lower than the lower elastic member,
wherein the lower elastic member is spaced apart from the lateral plate of the cover can, and
wherein an insulation member is disposed between the lateral plate of the cover can and the two terminal parts.

* * * * *